United States Patent [19]

Breuer

[11] Patent Number: 4,971,111

[45] Date of Patent: Nov. 20, 1990

[54] ROTARY PISTON VALVE ARRANGEMENT

[75] Inventor: Heribert Breuer, Dortmund, Fed. Rep. of Germany

[73] Assignee: Allmineral Aufbereitungstechnik GmbH & Co. KG, Duisburg, Fed. Rep. of Germany

[21] Appl. No.: 436,601

[22] Filed: Nov. 15, 1989

[30] Foreign Application Priority Data

Nov. 15, 1988 [DE] Fed. Rep. of Germany ....... 3838623

[51] Int. Cl.[5] ............................................ F16K 11/10

[52] U.S. Cl. ............................ 137/624.13; 137/596; 137/862; 209/502

[58] Field of Search .................. 137/596, 624.13, 862; 209/502

[56] References Cited

U.S. PATENT DOCUMENTS 4,566,487 1/1986 Lotz ................................ 209/502 X

*Primary Examiner*—Gerald A. Michalsky

*Attorney, Agent, or Firm*—Robert W. Becker & Associates

[57] ABSTRACT

A rotary piston valve arrangement, for a pneumatic settling tank, including rotary piston valves disposed in a common housing, with a first rotary piston valve being designed for the control of an additive stroke, and a second rotary piston valve being designed for the control of a discharge position. To reduce the amount of air required for controlling the settling tank, an element is provided for periodically shutting off the passage of air between the air inlet opening of the first rotary piston valve and the settling chamber during the time interval of an intake position of the first rotary piston valve and a simultaneous discharge position of the second rotary piston valve.

11 Claims, 2 Drawing Sheets

ROTARY PISTON VALVE ARRANGEMENT

BACKGROUND OF THE INVENTION

The present invention relates to a rotary piston valve arrangement, for a pneumatic settling tank, and includes rotary piston valves disposed in a common housing, with a first rotary piston valve being designed for the control of an additive stroke, and a second rotary piston valve being designed for the control of a discharge operation.

A rotary piston valve arrangement of the aforementioned general type is disclosed in German Patent No. 34 00 659 and refers extensively to German Patent No. 26 54 593 for its particular manner of operation. German Patent No. 34 00 659 discloses a particular embodiment of a rotary piston valve arrangement where the double rotary piston valve that is disposed in the bottom half of the housing serves merely for the control of the discharge for the air that is supplied from the upper rotary piston valve as additive strokes of the settling chamber of the pneumatic settling tank, so that the double rotary piston valve merely has discharge windows, and the bottom half of the housing is provided with associated air outlet openings.

Proceeding from the embodiment described in German Patent No. 34 00 659 where the speed of the rotary piston for the additive control of the air inlet is four times the speed of the double rotary piston valve for the control of the discharge, the known rotary piston valve arrangement has the drawback that at the same time as the fourth air introduction of the inlet rotary piston valve, the lower double rotary piston valve reaches its discharge position, so that the air that was to be supplied to the settling chamber with the fourth air introduction flows directly away, without effect, to the air outlet openings via the rotary pistons of the double rotary piston valve, so that a portion of the energy expended for generating the flow of air is not converted.

It is therefore an object of the present invention to improve a rotary piston valve arrangement of the aforementioned general type in such a way that during operation of a settling tank that is controlled with a double rotary piston valve arrangement, the air throughput is reduced.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
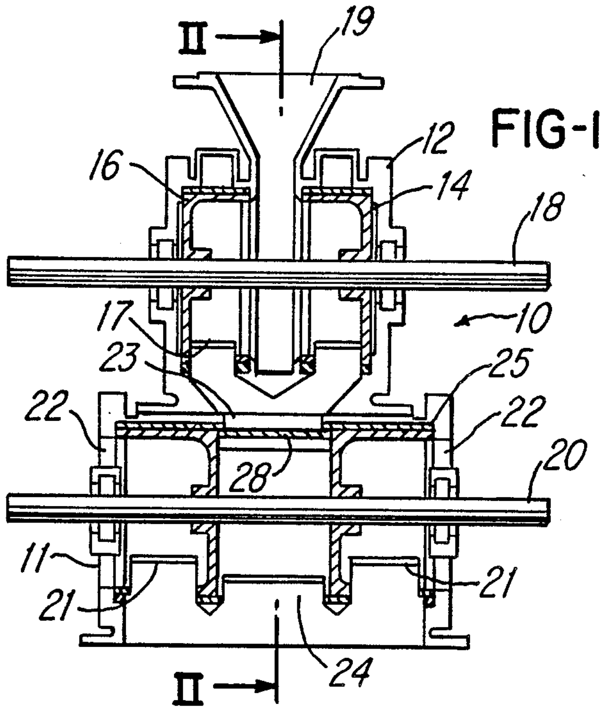
FIG. 1 is a longitudinal cross-sectional view through one exemplary embodiment of the inventive rotary piston valve arrangement.

The rotary piston valve arrangement of the present invention is characterized primarily by a means or element for periodically shutting off the passage of air between an air inlet opening of the first rotary piston valve and a settling chamber during a time interval of an intake position of the first rotary piston valve and a simultaneous discharge position of the second rotary piston valve.

The present invention has the advantage that the air introduction via the rotary piston valve that controls the additive stroke is blocked or shut off during the discharge that is simultaneously released by the double rotary piston valve, so that to this extent no air is removed from the air reservoir that is provided for the supply of compressed air and that precedes the rotary piston valve arrangement. In so doing, the overall quantity of air required for operating the pneumatic settling tank is reduced, so that the necessary installation capacity for the blower is kept lower, with the result that not only the capital investment but also the operating costs of the pneumatic settling tank that is controlled with the inventive rotary piston valve arrangement are reduced.

In this connection, it is important for the present invention that the air passage between the air inlet opening and the introduction opening to the settling chamber be shut off during the simultaneous intake and discharge positions of the upper and lower rotary piston valves, so that during the discharge position, no further air is supplied to the settling chamber.

Pursuant to one preferred specific embodiment of the present invention, there is initially provided between the rotary pistons of the double rotary piston valve, which rotary pistons are disposed on both sides of the air passage, a shutoff element that is connected to the rotary pistons and rotates therewith, with this shutoff element spanning the flow path of the air and having the configuration of a circular arc. Pursuant to one alternative, this shutoff element can cooperate with the opening between the halves of the housing, hence being disposed across from the outlet openings of the rotary pistons of the double rotary piston valve, so that in the discharge position of the double rotary piston valve, the shutoff element closes off the opening between the two halves of the housing and hence shuts off or blocks the air passage during the discharge position of the double rotary piston valve.

Pursuant to another alternative, the shutoff element can be disposed in the same plane as the outlet openings in the rotary pistons of the double rotary piston valve, whereby the shutoff element then cooperates with the lower introduction opening to the settling tank and at this location shuts off the air passage in the discharge position of the double rotary piston valve. In so doing, it is expedient for the peripheral dimension of the shutoff element to be somewhat greater than the similarly oriented dimension of the outlet openings in the rotary pistons of the double rotary piston valve, so that at the commencement of the discharge position of the double rotary piston valve, the shutoff effect has already occurred.

Pursuant to one preferred specific embodiment of the present invention, the openings that cooperate with the shutoff element are structurally defined in that the valve sleeves of the two outer rotary pistons of the double rotary piston valve are drawn together to form a single component that spans the flow path in the housing of the rotary piston valve arrangement. To ensure the air passage, the unitary valve sleeve has an upper and a lower window that cooperates with the shutoff element that rotates with the rotary pistons of the double rotary piston valve in the manner already described. Also in this connection the shutoff element can be disposed either across from the outlet openings of the rotary pistons of the double rotary piston valve or can be disposed in a plane therewith. In so doing, it can be expedient for the shutoff element to be somewhat larger than the associated window of the valve sleeve.

Pursuant to another alternative of the present invention, the air inlet opening or the introduction opening to the settling chamber can be released or blocked via a periodically controlled valve, so that also at these locations the air passage is interrupted during the discharge position of the double rotary piston valve.

It is to be understood that the present invention is not limited to the arrangement of a double rotary piston valve for controlling the discharge position; rather, it is also possible to provide a symmetrical arrangement of two individual rotary piston valves for the control of the air introduction as well as the air outlet.

The present invention also covers such rotary piston valve arrangements which, in the manner described in German Patent No. 34 00 659, are designed for the control of a primary stroke, whereby in such a case the rotary pistons of, for example, a double rotary piston valve are similarly provided with introduction openings to the settling chamber and air introduction openings that are associated with the housing.

Further specific features of the present invention will be described in detail subsequently

DESCRIPTION OF PREFERRED EMBODIMENTS

Referring now to the drawing in detail, disposed in the bottom half 11 of a single housing 10 is a double rotary piston valve 13, while a single rotary piston valve 14 is disposed in the top half 12 of the housing. The rotary piston valve 14 is disposed symmetrically above the center of and between the rotary pistons 15 of the lower rotary piston valve 13. The single rotary piston valve 14 controls the air intake for the additive stroke via appropriate openings 17 in its rotary piston 16 which is disposed on a shaft 18. The compressed air, which is supplied from a non-illustrated air reservoir, enters the top half 12 of the housing via an air inlet opening 19.

The rotary pistons 15 of the double rotary piston valve 13 are seated on a common shaft 20 and are provided with outlet openings 21 to control the air discharge, with associated air outlet openings 22 being provided in the bottom half 11 of the housing so that in the appropriate position of the rotary pistons 15, a discharge path out of the housing 10 via the openings 21, 22 results for the air that is supplied from the upper rotary piston valve 14 of the non-illustrated settling chamber.

In the illustrated embodiment, the lower rotary piston valve 13 serves exclusively for the control of the air discharge, so that the bottom half 11 of the housing has no air inlet openings, i.e. the double rotary piston valve 13 has no inlet openings that are directed toward the settling chamber. The pulsation air that is required for the operation of the settling tank is supplied to the settling chamber exclusively as a function of the rotational speed of the rotary piston 16 of the rotary piston valve 14 via an opening 23, which is disposed between the bottom and top halves 11, 12 of the housing, and a lower introduction opening 24 that is directed toward the settling chamber.

In the illustrated embodiment, the valve sleeves 25 that surround the outside of the rotary pistons 15 of the double rotary piston valve 13 are interconnected and span the distance between the rotary pistons 15. The valve sleeves 25 are provided with a window 26 which is aligned with the opening 23 between the top half 12 of the housing and the bottom half 11 of the housing, as well as with a window 27, which is aligned with the lower introduction opening 24 to the settling chamber, so that the air flow between the inlet opening 19 and the lower introduction opening 24 is not interrupted by the unitary valve sleeve 25.

Figure 2:
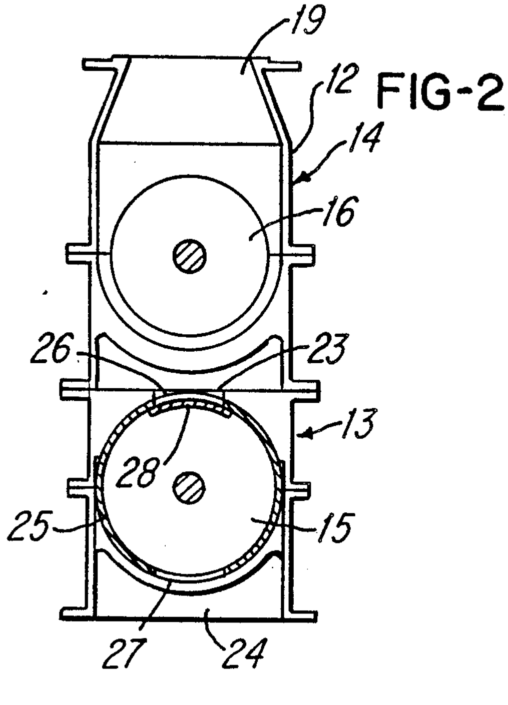
FIG. 2 is a cross-sectional view taken along the line II—II in FIG. 1.

In the illustrated embodiment, the rotary pistons 15 of the double rotary piston valve 13 are interconnected by a shutoff element 28 that extends in a circular arc over approximately 90° and rotates along with the rotary pistons 15. The shutoff element 28 is disposed across from the outlet openings 21 in the rotary pistons 15, so that in the discharge position of the rotary piston valve arrangement shown in FIG. 2, the flow of air into the settling chamber, and hence also to the air outlet openings 22, is interrupted.

Figure 3:
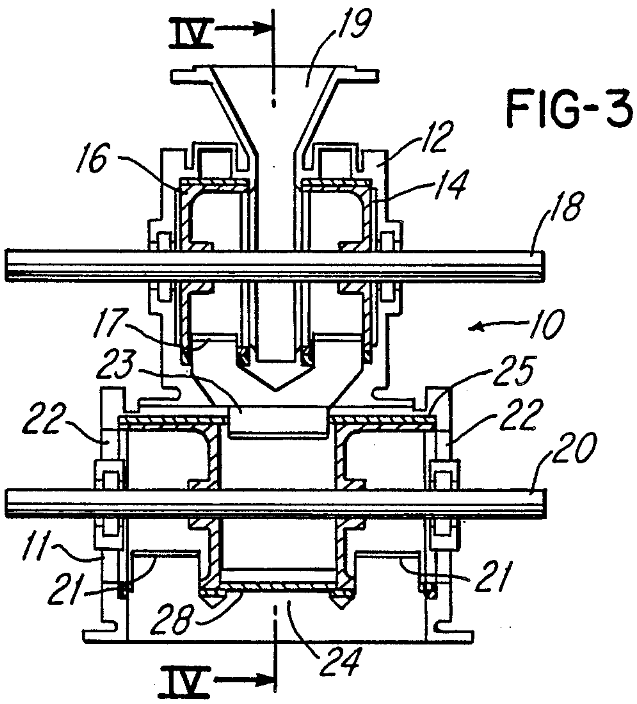
FIG. 3 is a view similar to FIG. 1, but with the shutoff element shifted by 180°.
Figure 4:
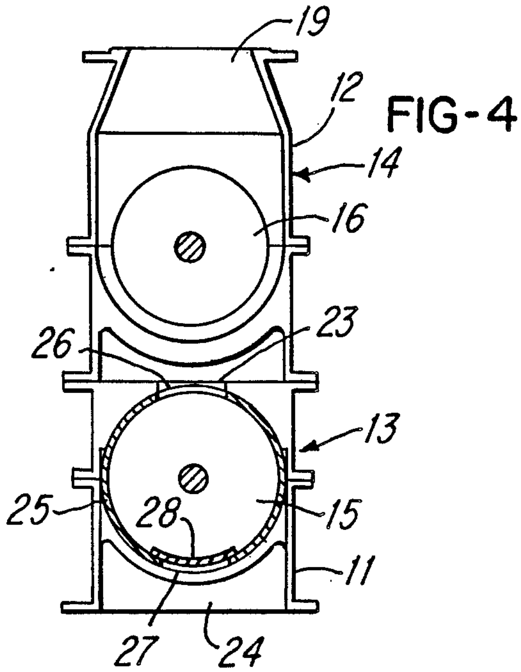
FIG. 4 is a cross-sectional view taken along the line IV—IV in FIG. 3.

As illustrated in FIGS. 3 and 4, the shutoff element 28 can also be disposed in the same plane as the outlet openings 21 of the rotary pistons 15, and can consequently cooperate with the lower window 27 of the valve sleeve 25 in the manner described.

Finally, the double rotary piston valve 13 can also be designed to control the primary stroke, as described in the aforementioned German Patent No. 34 00 659, in which connection the bottom half 11 of the housing would be provided with additional air inlet openings, and the rotary pistons 15 of the double rotary piston valve 13 would have further air introduction openings that are directed toward the settling chamber.

The present invention is, of course, in no way restricted to the specific disclosure of the specification and drawing, but also encompasses any modifications within the scope of the appended claims.

What I claim is:

1. In a rotary piston valve arrangement, for a pneumatic settling tank, and including rotary piston valves disposed in a common housing, with a first rotary piston valve being designed for the control of an additive stroke, and a second rotary piston valve being designed from the control of a discharge operation, the improvement comprising:
   - means for periodically shutting off the passage of air between an air inlet opening of said first rotary piston valve and a settling chamber during the time interval of an intake position of said first rotary piston valve and a simultaneous discharge position of said second rotary piston valve.

2. A rotary piston valve arrangement according to claim 1, in which said housing has two halves that communicate with one another via an internal opening, with a bottom one of said housing halves having a lower introduction opening to said settling chamber, and with said second rotary piston valve being a double rotary piston valve, the rotary pistons of which are interconnected via said shutting-off means, which is embodied as a shutoff element that has a circular arc configuration and spans a flow path between said internal opening and said lower introduction opening.

3. A rotary piston valve arrangement according to claim 2, in which said first rotary piston valve is provided with introduction window means, and in which a peripheral dimension of said shutoff element is somewhat greater than a similarly oriented dimension of said window means.

4. A rotary piston valve arrangement according to claim 2, in which said rotary pistons of said double rotary piston valve are provided with outlet openings, and in which said shutoff element is disposed 180° from said outlet openings and cooperates with said internal opening between said halves of said housing.

5. A rotary piston valve arrangement according to claim 2, in which said rotary pistons of said double rotary piston valve are provided with outlet openings, and in which said shutoff element is disposed in the same plane as said outlet openings and cooperates with said lower introduction opening to said settling chamber.

6. A rotary piston valve arrangement according to claim 2, in which said rotary pistons of said double rotary piston valve are provided with valve sleeves that are interconnected to form a single valve sleeve and span the flow path for air supplied from said first rotary piston valve, with said single valve sleeve being provided with oppositely disposed windows to conduct said air through into said settling chamber; and in which said shutoff element, which rotates along with said rotary pistons, is somewhat larger than said windows of said valve sleeve.

7. A rotary piston valve arrangement according to claim 6, in which said rotary pistons of said double rotary piston valve are provided with outlet openings; and in which said shutoff element, which is disposed between said rotary pistons, cooperates with a first one of said windows of said valve sleeve that is associated with said internal opening between said halves of said housing, with said shutoff element being disposed 180° from said outlet openings of said rotary pistons.

8. A rotary piston valve arrangement according to claim 6, in which said rotary pistons of said double rotary piston valves are provided with outlet openings; and in which said shutoff element, which is disposed between said rotary pistons, cooperates with a second one of said windows of said valve sleeve that is associated with said lower introduction opening, with said shutoff element being disposed in the same plane as said outlet openings of said rotary pistons.

9. A rotary piston valve arrangement according to claim 1, which includes valve means that is adapted to close off said inlet opening into said housing and is controllable into a periodic opening and closing movement.

10. A rotary piston valve arrangement according to claim 1, which includes, disposed between said housing thereof and the air chamber of said settling tank, a valve means that is adapted to close off an air introduction into said settling chamber and is controllable into a periodic opening and closing movement.

11. A rotary piston valve arrangement according to claim 1, in which said second rotary piston valve, in addition to being designed for the control of a discharge operation, is designed for a primary control, with additional air inlet openings being provided in that portion of said housing that accommodates said second rotary piston valve.

* * * * *